H. O. HEM.
CHECK LINK MECHANISM.
APPLICATION FILED OCT. 23, 1916.
1,285,163.
Patented Nov. 19, 1918.
3 SHEETS—SHEET 1.
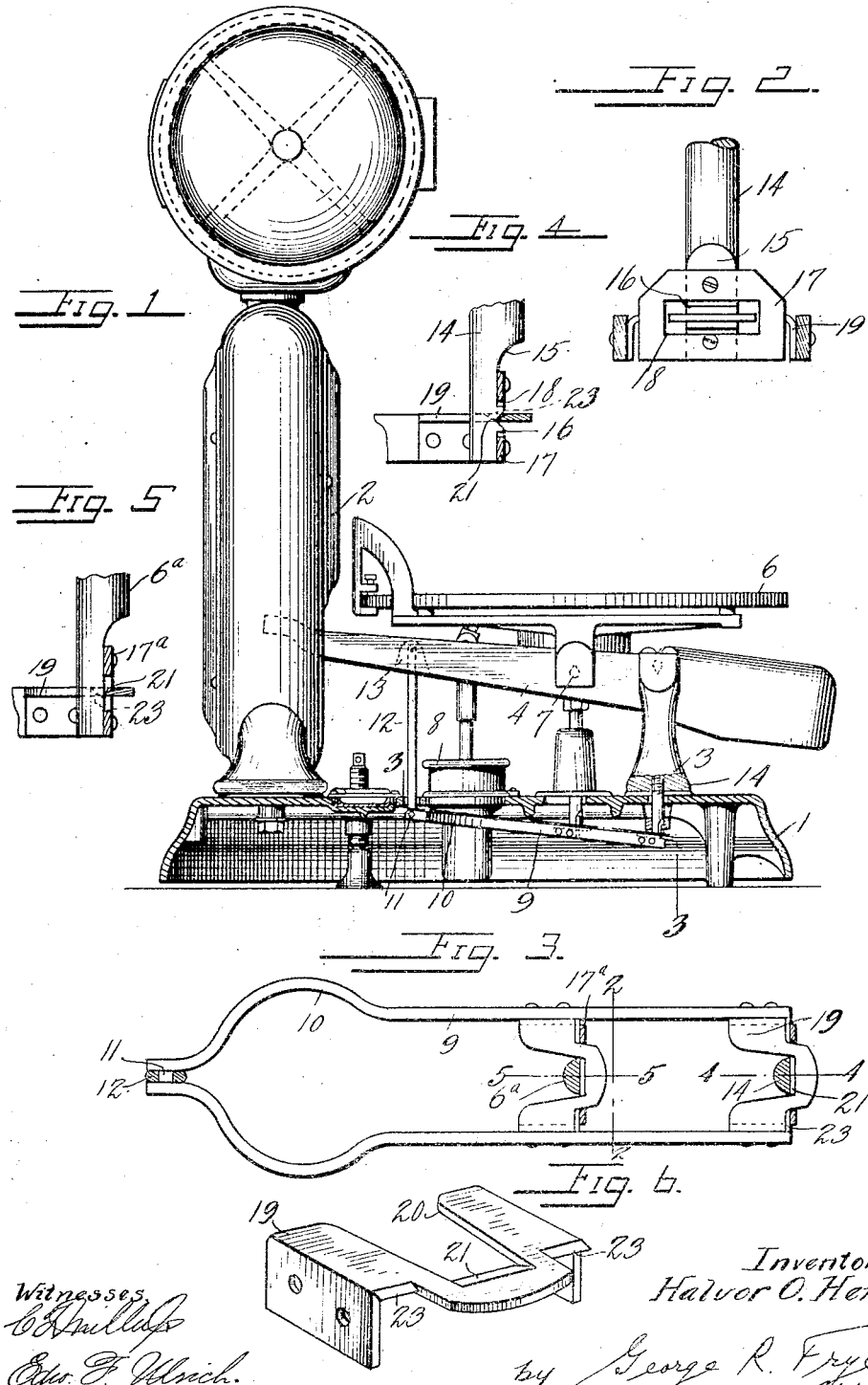
Witnesses
Inventor.
Halvor O. Hem.
by George R. Frye
Atty.

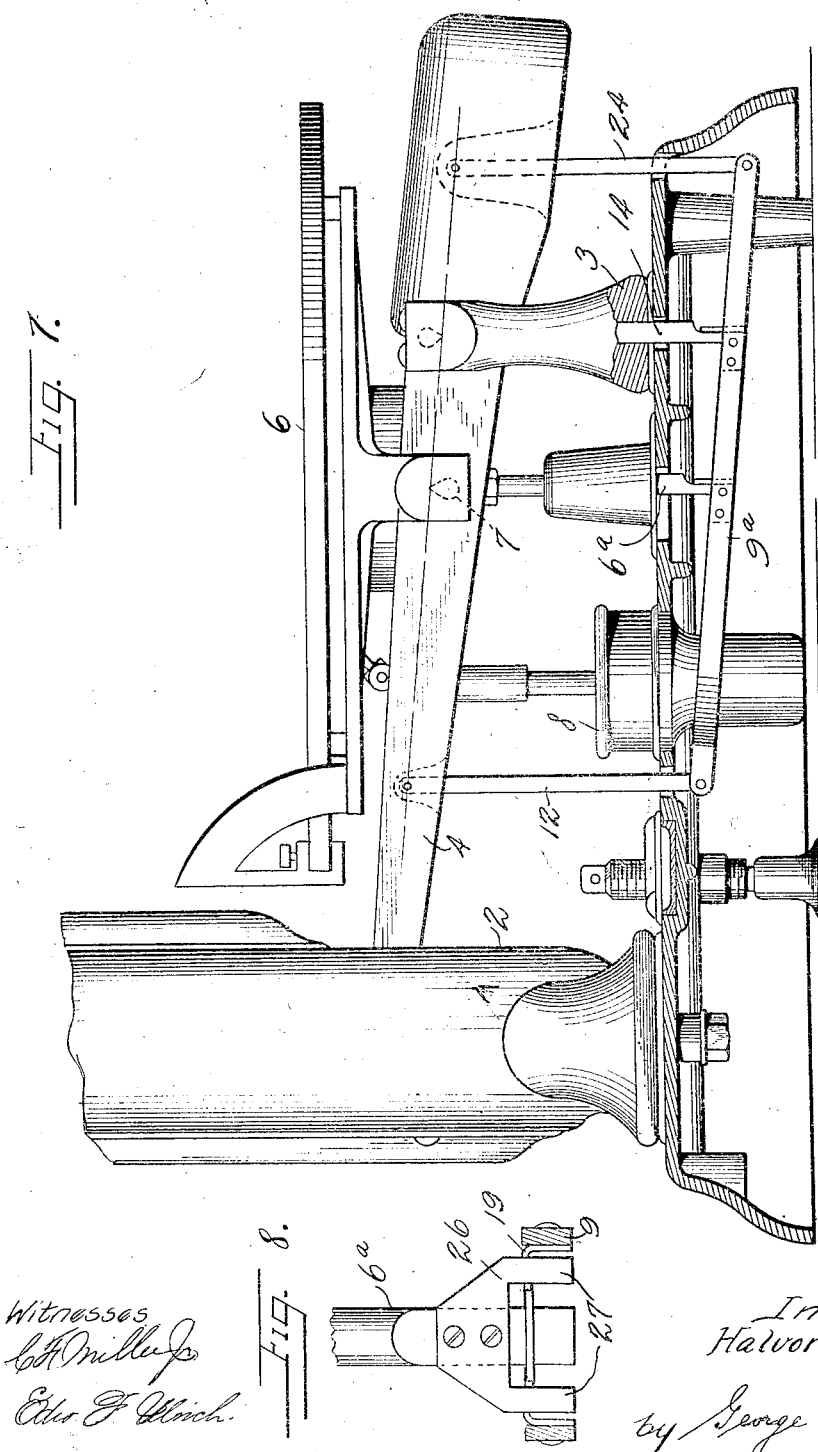

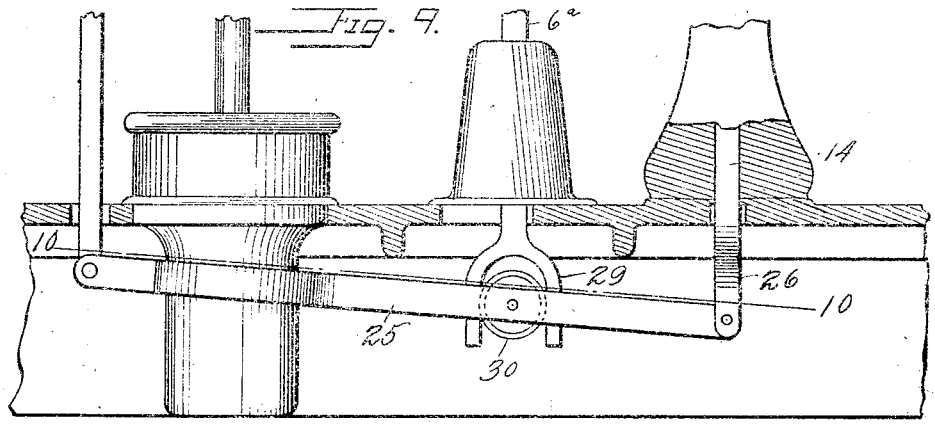
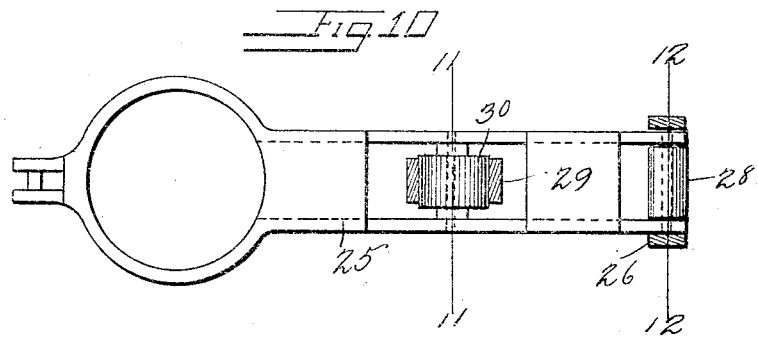
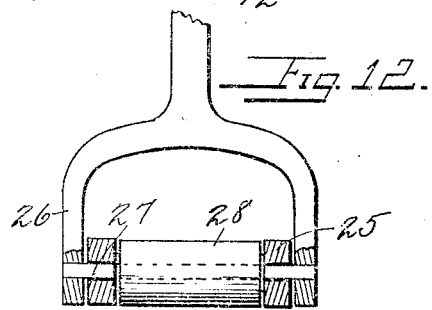
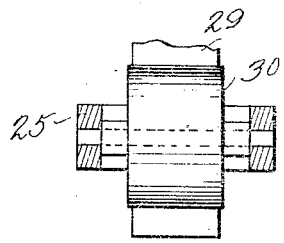

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

CHECK-LINK MECHANISM.

1,285,163.　　　　　Specification of Letters Patent.　　Patented Nov. 19, 1918.

Application filed October 23, 1916. Serial No. 127,259.

*To all whom it may concern:*

Be it known that I, HALVOR O. HEM, a citizen of the United States, residing at Toledo, in the county of Lucas and State of Ohio, have invented certain new and useful Improvements in Check-Link Mechanism, of which the following is a specification.

This invention relates to weighing scales, and more particularly to that type of weighing scales having a scale beam supporting a platter or like load-receiving means upon two bearing pivots, such scales being particularly known as counter scales and used upon the counters of stores, shops, factories and the like.

In the two-point bearing type of scale it is necessary to employ a check link mechanism in connection with the scale beam to cause the platform to descend in a vertical position and at the same time remain in a true horizontal position during the entire weighing operation, and also to prevent tipping of the platform when the load to be weighed is placed adjacent the edges thereof. The check link mechanism heretofore employed has consisted of a check-rod or link interposed between a check post arranged in vertical alinement with the fulcrum pivots of the scale beam and a post carried by the scale platform, this check link being of the same length as the distance between the fulcrum and platform-supporting pivots and arranged at the same angle so as to maintain a parallelogram. When for any reason, such as the shrinking of the metal, the wearing of the pivots, or the contraction of the cement supporting the agate bearings, the parallelogram is destroyed, the scale will inaccurately indicate the weight of a load placed on the platform, this inaccuracy becoming greater as the departure from a true parallelogram increases. It is the object of the present invention to overcome the inaccuracy of this indication and to provide a construction wherein the same causes which would heretofore render the scale inaccurate may occur without seriously affecting the accurate reading of the scale. Thus the platform may descend, due to the settling of the cement about the bearings, the wearing of the pivots, etc., and the post carried by the platform will simultaneously descend and move relatively to the check link without affecting the position of said check link or destroying the parallelogram. Similarly, the fulcrum pivots may fall, due to the shrinking of the metal of the base horns, the wearing of the pivots, etc., and the scale beam will simultaneously fall therewith and carry with it the platter and one connection of the check link so that the change in position will not disarrange the predetermined parallelogram. Furthermore by materially increasing the length of the check link mechanism and extending the same beyond its point of engagement with the platform post where it is connected with the scale beam I provide means whereby the same derangement of the parallelogram which heretofore has caused marked inaccuracies would be so divided up that the error would be decreased in proportion to the ratio of increase in length of the scale rod. For example, if the old check rod were 4 ins. in length and one end thereof settled ½ in., the error caused by such settling would very seriously affect the accuracy of the scale. If, however, I extended the check rod so that it had a length of 12 inches, the same settling of one end thereof of ½ inch would affect the accuracy of the scale only ⅓ as much. Moreover, if the settling occurred on the platform support, causing the post carried thereby to descend, the falling of this post ½ in. would not affect the accuracy of the scale inasmuch as the post can move relatively to the check link without disturbing the predetermined parallelogram.

Other objects and advantages will be apparent from the following description, wherein reference is had to the accompanying drawings illustrating preferred embodiments of my invention and wherein similar reference numerals designate similar parts throughout the several views.

In the drawings:—

Figure 1 is a side elevation of a weighing scale equipped with my improved check link; Fig. 2 is a transverse sectional view taken on the line 2—2 of Fig. 3; Fig. 3 is a horizontal sectional view taken on the line 3—3 of Fig. 1; Fig. 4 is a detail sectional view taken on the line 4—4 of Fig. 3; Fig. 5 is a similar view taken on the line 5—5 of Fig. 3; Fig. 6 is a perspective view of the knife edge bracket; Fig. 7 is a side elevation of a scale equipped with a modified form of my invention; Fig. 8 is a modified form of the plate 17ª; Fig. 9 is a side elevation of a scale equipped with a modified form of my invention; Fig. 10 is a sectional view taken on the line 10—10 of Fig. 9; and Figs. 11 and 12 are sectional views taken on the lines 11—11 and 12—12 respectively of Fig. 10.

Referring first to the embodiment illustrated in Figs. 1–6, the numeral 1 designates the base of the scale and 2 the housing thereof. Formed on the base 1 are the usual base horns 3 supporting the scale beam 4. The platter 6 is pivotally mounted upon the scale beam 4 and carries the rod 6ª which extends through an aperture in the base 1 in the usual manner. A dash pot 8 mounted upon base 1 forwardly of the platter is connected to the scale beam in the conventional manner.

My improved check link is positioned within the base 1 and comprises a pair of spaced rods 9, bowed outwardly as at 10 to allow the check link to clear the dash pot 8. The ends of the rods 9 adjacent the bowed portion 10 are connected by a pin 11, to which is pivoted the lower end of a rod 12, the other end of which swings from a recessed portion 13 of the scale beam 4. The opposite ends of the check-rods 9 are pivotally connected with the usual shift post 14 adjustably mounted in the base horn 3 in vertical alinement with the fulcrum pivots of the beam 4. The lower end of the shift post 14 is preferably cut away, as at 15, and is provided with a boss 16 formed with a V-shaped bearing for the reception of the knife pivot 21. A slotted plate 17 is secured to the lower end of the shift post 14, the elongated slot 18 therein surrounding the boss 16, and the rear face of the plate providing contact surfaces for the knife-edge pivots 23.

The double knife-edge pivots, carried by the rods 9, are preferably provided with U-shaped brackets 19 riveted to the sides thereof. As shown, two of these brackets are employed, each of which is formed with a central recess 20, the inner wall of which is formed as a knife-edge 21 alining with the oppositely extending knife-edge pivots 23 formed on the opposite sides of the bracket. As will be seen in Fig. 4, the knife-edge 21 of the bracket 19 coöperating with the shift post 14 seats in the V-shaped bearing of the boss 16, while the knife-edges 23 of this bracket rest against the flat surface of the plate 17. The other bracket 19 coöperates with the rod 6ª depending from the platter, the lower portion of which is cut away and ground to provide a vertical face adapted to be contacted by the knife-edge 21 of this second bracket, whereby relatively vertical movement of these parts is permitted without affecting the position of the check rods 9. (See Fig. 5.) A slotted plate 17ª is secured to this bracket and provides contact faces for the side knife-edges 23 of the bracket. By virtue of this construction the platform post 6ª can move relatively to the knife-edge 21 of the bracket coöperating therewith, thereby permitting the settling of the platform and post because of shrinking of the metal, wearing of the pivots, or any of the usual causes which are met with in the ordinary usage of weighing scales. Similarly, if the scale beam falls because of the shrinking of the metal of the base horn 3, the wearing of the pivots or other reasons, the rod 12 suspended from the scale beam will likewise fall, lowering one end of the check-rod 9 and causing the knife-edge 21 of the bracket 19 to move downwardly along the face of the platform post 6ª. These movements of the platform post and scale beam are the movements which have heretofore seriously affected, if not destroyed, the accuracy of scales of this type. In scales wherein the check link mechanism is secured to the platform post the falling of this post will immediately destroy predetermined parallelogram, and this is one of the most frequent causes of inaccurate scales. With my improved check link mechanism it is possible, however, for the platform and post to settle without in any way affecting the accuracy of the scale.

It will be noted that for the use of my check link mechanism it is only necessary that the scale beam support the platform on two bearing points, and such scale beam can be employed with any of the well-known types of weighing mechanism, such as spring, pendulum and other gravity mechanisms.

In operation, the inner end of the scale beam 4 within the housing 2 is connected with the steelyard rod through which engagement is made with the pendulum or like load-offsetting mechanism, thereupon the placing of a load to be weighed upon the platform 6 will cause the inner end of the scale beam to swing downwardly, exerting a pull upon the steelyard rod to operate the pendulum or other load-offsetting mechanism to counterbalance the weight of the load upon the platform, and through suitable indicating means the weight of the load is shown.

It will be noted that the distance between the knife-edges 21 of the brackets 19 is identical with the distance between the fulcrum and platform-supporting pivots of the scale beam, and these knife-edges contact with the faces of the shift post 14 and platform post 6ª respectively. Also the check-rod 9 is arranged in a plane parallel to the plane in which the knife-edges of such pivots lie, the check rod extending beyond the platform post for some distance. Thus the platform post is maintained in the same spaced relation from the shift post 14 during the entire weighing operation, while the increased length of the check-rod will materially diminish the effect of any derangement of the parallelogram that may occur. The tipping of the platform due to the placing of the load to be weighed adjacent the edges thereof is also prevented, inasmuch as the alined knife-edges 21 and 23 of the brackets 19 contact with the posts 6ª and 14 and the brackets 17 and 17ª to prevent any lateral shift of the check link.

In the modified form of my invention illustrated in Figs. 7 and 8, the check link extends on both sides of the shift post 14 and comprises elongated spaced rods 9ª pivotally suspended at one end to the scale beam by means of the rod 12, as in Fig. 1, and having its other end similarly suspended from the scale beam on the opposite side of the fulcrum pivots by means of a suspension rod 24. The platform post 6ª and the shift post 14 are cut away at 15 and provided with smooth vertical bearing faces similar to the post 6ª in the first described modification, whereby the knife pivots engaging these faces and the posts can partake of independent vertical movement. The pivots of the rods 12 and 24 in the beam 4 are preferably in alinement with the knife edges of the fulcrum and platform-supporting pivots thereof. It will readily be seen that any vertical displacement of the platter or fulcrum pivots will not disturb the parallelogram relation between the check link and the scale beam.

In Fig. 8 is shown a contact plate 26 provided with a forked lower portion 27 which may be interchangeably used with the plate 17 to facilitate assembling of the check link upon the scale.

In the modification illustrated in Figs. 9–12, the check link 25 is adapted to swing from the beam 4 at one end and pivotally connect to the shift post 14 at the opposite end thereof, similar to the embodiment shown in Fig. 1. The shift post 14 is formed at its lower end with a bifurcated portion 26 extending transversely of the check link, and carries a shaft 27 rotatably journaled within a ball or similar anti-friction bearing 28 mounted on the check link 25. The platform post 6ª is formed with a bifurcated portion 29 extending longitudinally of the check link, and slidably engages a ball or similar bearing 30 revolubly mounted upon the check link 25. Thus, it will readily be seen that any vertical dislodgment of the platter or fulcrum pivots will not disturb the parallelogram relation between the check link and the scale beam.

While it will be apparent that the illustrated embodiments of my invention herein disclosed are well calculated to adequately fulfil the objects primarily stated, it is to be understood that the invention is susceptible to modification, variation and change without departing from the spirit and scope of the invention as set forth in the subjoined claims.

Having described my invention, I claim:

1. In a weighing scale, the combination of a base, a scale beam fulcrumed thereon, a platform pivotally supported upon the beam, a check link and means for connecting one end of the check link with the scale beam out of vertical alinement with the platform pivots and the other end thereof in vertical alinement with the fulcrum pivots of the scale beam.

2. In a weighing scale, the combination of a base, a scale beam fulcrumed thereon, a platform pivotally supported upon the beam, a check link and means for connecting one end thereof with the scale beam out of vertical alinement with the platform pivots and the other end pivoted in vertical alinement with the fulcrum pivots of the scale beam, and means extending from the platform in vertical alinement with the platform-supporting pivots and engaging the check link intermediate its ends.

3. In a weighing scale, the combination of a base, a scale beam fulcrumed thereon, a platform pivotally supported upon the beam, a check link and means for connecting one end thereof with the scale beam out of vertical alinement with the platform pivots and the other end thereof in vertical alinement with the fulcrum pivots of the scale beam, and means extending from the platform in vertical alinement with the platform-supporting pivots and engaging the check link intermediate its ends, said means being arranged for slight vertical movement relatively to the check link.

4. In a weighing scale, the combination of a scale beam, a platform pivotally supported thereon, adjustable posts extending downwardly in vertical alinement with the fulcrum and platform-supporting pivots of the scale beam, a check link provided with knife-edge pivots for engagement with said post, and means for suspending one end of the check link from the scale beam.

5. In a weighing scale, the combination of a scale beam, a platform pivotally supported thereon, adjustable posts extending downwardly in vertical alinement with the fulcrum and platform-supporting pivots of the scale beam, a check link provided with a pair of knife-edge pivots, one of which is pivotally seated upon the post in alinement with the fulcrum pivots and the other of which contacts with the other post, and means for suspending one end of the check link from the scale beam.

6. In a weighing scale, the combination of a scale beam, a platform pivotally supported thereon, adjustable posts extending downwardly, a check link provided with a pair of knife-edge pivots, one of which is pivotally seated upon the post in alinement with the fulcrum pivots and the other of which contacts with the other post, and means for suspending one end of the check link from the scale beam.

7. In a weighing scale, the combination of a scale beam, a platform pivotally supported thereon, adjustable posts extending downwardly in vertical alinement with the fulcrum and platform-supporting pivots of the scale beam, a check link provided with a pair of knife-edge pivots, one of which is pivotally seated upon the post in alinement with the fulcrum pivots and the other of which contacts with the post in alinement with the platform pivots, whereby relative vertical movement of said post and pivot may be effected, and means for suspending one end of the check link from the scale beam.

8. In a weighing scale, a check link mechanism including a pair of vertical posts disposed in alinement with the fulcrum and platform-supporting pivots of the scale beam, an elongated rod having a pair of knife-edge pivots thereon respectively engaging said posts and adapted to hold them in spaced relation, and means for suspending one end of the rod from the scale beam.

9. In a weighing scale, a check link mechanism including a pair of vertical posts disposed in alinement with the fulcrum and platform-supporting pivots of the scale beam, an elongated link consisting of a pair of spaced rods having knife-edge pivots mounted between same and adapted to contact with said vertical posts to maintain them in spaced relation, and means for pivotally suspending one end of the link from the scale beam.

10. In a weighing scale, the combination of a base, a scale beam fulcrumed thereon, a platform pivotally supported upon the beam, a check link carrying means engaging the platform, and means for suspending one end of the check link from the scale beam.

11. In a weighing scale, the combination of a base, a scale beam fulcrumed thereon, a platform pivotally supported upon the beam, a check link, means for connecting one end thereof to the scale beam, and means connecting the platform with said check link intermediate its ends and permitting vertical movement relatively to the check link.

12. In a weighing scale, the combination of a scale beam, a platform pivotally supported thereon, adjustable posts extending downwardly in vertical alinement with the fulcrum and platform-supporting pivots of the scale beam, and a check link having means for suspending it from the scale beam and provided with knife-edge pivots for engagement with said posts.

13. In a weighing scale having a scale beam and a platform pivotally supported thereon, a pair of vertical posts disposed in alinement with the fulcrum and platform supporting pivots of the scale beam, check link mechanism having means for suspending it from the scale beam, knife-edge pivots carried by said check link, and forked plates carried by said posts, the tines thereof being adapted to engage the knife edges of said pivots.

14. In a weighing scale having a scale beam and a platform pivotally supported thereon, a check link having means for suspending it from the scale beam, and means depending from the platform engaging the check link intermediate its ends.

15. In a weighing scale having a scale beam and a platform pivotally supported thereon, a check link having means for suspending one end thereof from the scale beam, and means depending from the platform engaging the check link intermediate its ends.

16. In a weighing scale and in combination with the base, beam and platform thereof, a check link pivoted at one end in the vertical plane of the fulcrum pivots, a link connecting the other end of the check link to the beam, and a member rigid with the platform and loosely engaging the check link and susceptible of vertical movement relative thereto.

17. In a weighing scale and in combination with the base, beam and platform thereof, a check link pivoted at one end in the vertical plane of the fulcrum pivots, a link suspending the other end of the check link from the beam, and a post rigid with the platform and loosely engaging the check link and susceptible of vertical movement relative thereto.

HALVOR O. HEM.

Witnesses:
GEORGE R. FRYE,
C. F. MILLER, Jr.

Copies of this patent may be obtained for five cents each, by addressing the "Commissioner of Patents, Washington, D. C."